United States Patent Office 3,147,710
Patented Sept. 8, 1964

3,147,710
IGNITION SYSTEM FOR SOLID PROPELLANTS
Martin E. Gluckstein, Farmington, Mich., assignor to Ethyl Corporation, New York, N.Y., a corporation of Virginia
No Drawing. Filed Feb. 27, 1961, Ser. No. 91,611
8 Claims. (Cl. 102—70)

This invention relates to rocket propulsion and, more particularly, to novel solid propellant compositions, and to an improved method of igniting solid propellant rocket motors.

The solid propellants used in rocket propulsion are nonspontaneously ignited and, therefore, external energy must be supplied to initiate the combustion. The solid propellant and the geometry of the combustion chamber are designed so that a proper burning rate is achieved at somewhat fixed pressures and temperatures. The starting procedure is very critical for under certain conditions, improper ignition may cause an abnormally high chamber pressure, possibly leading to a violent explosion. Even short of a violent explosion, an extremely high rate of pressure rise may stress and fracture the propellant grain resulting in failure of the motor to function properly. Under other conditions, improper initiation causes the ignition pressure to be too low and proper ignition and performance of the propellant may not take place. Therefore, it is of utmost importance to reliably initiate combustion of the igniter material and the solid propellant so that the rocket motor may achieve its objective.

Various ignition systems incorporating pyrotechnic materials have been proposed to initiate propellant combustion. However, these systems have certain inherent undesirable characteristics. With many of these systems, a series of events must take place in order for the propellant grain to eventually ignite. Usually, an electric current is used to generate heat which ignites a small amount of primer charge. The energy generated by this reaction, in turn, ignites a larger volume of an igniter charge which in turn initiates combustion of the propellant grain in the combustion chamber. Usually, the igniter is put into the forward part of the combustion chamber so that ignition gases are caused to sweep past the grain surface and are then exhausted. The temperature and pressure within the combustion chamber are increased and energy is transferred to the propellant grain eventually causing it to ignite. Factors determinative of the efficiency of such systems are the reliability of igniting the primer and ignition charges, and the heat transfer from the products of combustion to the grain surface proper. With such proposed systems each reaction is dependent upon the previous, and a failure or malfunction in any one of the steps results in a failure to ignite the propellant. Moreover, rather than initiating combustion over a desired area of the propellant grain, combustion may start in only random, localized areas, thus leading to an erratic pressure rise and ignition in the combustion chamber. Another disadvantage of these proposed systems is the difficulty in meeting design requisites to initiate propellant combustion and yet not exceed chamber pressure limitations. As pointed out above, excessive chamber pressure may stress and fracture the grain leading to improper flight. Moreover, the inherent nature of the pyrotechnic materials used in these methods makes them temperature sensitive. Systems designed to function at one temperature may be ineffectual at a lower temperature, or produce excessive chamber pressures at higher temperatures.

It is an object of this invention to provide novel solid propellant compositions. Another object is to provide an improved method of initiating rocket propulsion. A more specific object is to provide a superior and more reliable method of igniting solid propellants.

My method of igniting solid propellants comprises reacting at least two chemicals on the surface of said propellant contiguous to the propellant combustion chamber, at least one of said chemicals being incorporated into said propellant surface, and at least one of said chemicals being introduced into the propellant combustion chamber, causing said chemicals to contact each other whereby spontaneous combustion of said chemicals takes place on said propellant surface, and transmitting sufficient energy to said propellant thereby causing it to ignite.

In a preferred embodiment, my method incorporates and has as an essential feature the hypergolic reaction of at least two chemicals on the surface of a heterogeneous propellant grain. The heterogeneous propellant grain, to be hereinafter described, incorporates a relatively thin coating on its surface, said coating being of a different composition than that of the propellant grain proper. The thin coating, containing at least one hypergolic chemical either in a pure form or admixed with other materials, is bonded to or deposited on the grain surface. A second chemical is introduced into the combustion chamber and is caused to contact the grain surface thereby producing a hypergolic reaction on the grain surface. The heat generated by this reaction is transmitted to the propellant grain proper thereby causing it to ignite.

In another aspect of this invention I provide novel heterogeneous solid propellant compositions. The ignition of these compositions by the method hereinbefore described constitutes a preferred embodiment of my method of igniting solid propellants. The novel heterogeneous propellant compositions comprise a solid propellant grain coated with a layer of at least one chemical capable of a hypergolic reaction when contacted with a second chemical. The coating may consist of the hypergolic chemical in an essentially pure form or the chemical may be admixed with up to about 50 percent by weight of other materials which serve as binders, adhesives, or diluents. In any event the composition of the coating is different than the composition of the propellant grain proper. The coating thickness may range from about 0.001 to about 0.1 inch. An adequate quantity of the coating material must be present so as to provide sufficient energy to ignite the heterogeneous propellant grain. However, an excessive coating thickness may lead to "caking"—upon initiation of the hypergolic reaction the coating may tend to cake and fall away from the propellant grain surface thereby reducing the efficiency of heat transfer. Therefore, I prefer to use a coating ranging in thickness from about 0.003 to about 0.020 inch.

The chemical may be incorporated on the propellant grain surface in a number of ways. It may be in the form of a thin sheet and bonded to the grain surface by means such as an adhesive. The chemical coating may be bonded to a metallic foil such as aluminum foil which in turn is bonded or fastened to the propellant grain. Alternatively, the chemical may be an integral part of and deposited on the surface during the fabrication of the solid propellant grain. When the surface of these compositions is contacted with an appropriate chemical, spontaneous combustion takes place thereby providing a novel and efficient method of igniting solid propellant grains.

The use of this preferred method permits the ignition of all types of solid propellant grains, independent of the inherent grain composition. In other words, the grain composition need not inherently contain a hypergolic chemical in order to be ignited by this method. Although some solid propellant compositions are in themselves capable of a hypergolic reaction, many are not. Moreover, even for propellant grains normally containing a hypergolic chemical more often than not the concentration of such chemical is not optimum for effective ignition. A prerequisite to changing the proportions of the hypergolic chemical in the propellant grain would be a thorough investigation as to the effects on the overall grain properties. Using my coating method, any propellant grain may be ignited without an attendant extensive and expensive investigation to determine changes in propellant grain performance.

For convenience in nomenclature, the chemical that is oxidized during the reaction is hereinafter referred to as the hypergolic igniter fuel, or simply the fuel, and the chemical that acts as the oxidizing agent will be referred to as the oxidizer. With my method either the fuel or the oxidizing agent is incorporated into the propellant grain surface. The second chemical required for the hypergolic reaction is then introduced into the combustion chamber and caused to contact the grain surface.

The chemical incorporated into the grain surface, be it a fuel or an oxidizer, shall hereinafter be referred to as the coating constituent. This chemical is normally a solid or a semisolid and is compatible with the grain composition. The chemical which is introduced into the combustion chamber will be referred to as the dispersed constituent. To obtain maximum and efficient contact between the two chemicals, the dispersed constituent is normally in the gaseous or liquid state, preferably liquid. To initiate the reaction and thereby ignite the propellant, the dispersed constituent, by some appropriate means, is introduced into the combustion and caused to contact the grain surface.

The method of this invention has the advantages of flexibility, simplicity, and reliability. All types of propellant grains may be ignited without altering performance characteristics which they were designed to meet. Moreover, ignition of the propellant is not dependent upon a previous series of reactions, but ignition is caused directly by one prior reaction. Another advantage is that streams of the dispersed constituent may be directed so as to be sprayed over the total propellant grain surface. In this manner, rather than localized ignition, combustion is initiated over all of the propellant grain surface. This type of ignition leads to the desired, even pressure rise in the combustion chamber. Still other advantages of this invention are rapid and efficient transfer from the igniting material to the propellant grain. Because the hypergolic reaction takes place on the propellant grain surface, a great percentage of the liberated energy is transferred directly to the grain proper, resulting in a rapid, reliable ignition of the propellant grain. Another important advantage is that only one chemical need be stored and introduced into the combustion chamber to initiate the reaction. Moreover, for maximum safety the vessel containing the chemical to be dispersed into the combustion chamber need not be positioned in the vehicle until just prior to flight. In situations wherein the position of the vessel within the vehicle is inaccessible, the chemical may be introduced into the vessel just prior to flight by the expediency of a delivery line from a source external to the vehicle. Other advantages will be apparent from the ensuing discussion.

Hypergolicity is a specific property of a reaction system, each reactant being mutually dependent upon the other for this property. Whereas a fuel may be hypergolic when contacted with a specific oxidizer, it is not necessarily the case when it is contacted with another oxidizing material and vice versa. Reaction systems that have this property may be determined empirically with a minimum of effort. From the wide range of fuels and oxidizers available, systems may be determined that have varying degrees of reactivity and energy release to conform with the requisites of igniting specific propellant grains.

In the subsequent discussion wherein the fuel and oxidizer constituents of the invention are described, no distinction is made as to the physical state of these materials. Those materials which are solid or semisolid are preferably used as the coating constituent and those that are gaseous or liquid are preferably used in the dispersed constituent.

Any chemical or mixture of chemicals that is hypergolic when contacted with an oxidizing medium can be used as the fuel of this invention. Materials that are useable as the fuel include metal hydrides, certain organometallic compounds, alkyl metal halides, alkyl metal hydrides, alkyl diboranes, alkyl boron amines, alkyl triborine triamines, and hydrazine and its derivatives. These materials when contacted with an appropriate oxidizer are capable of spontaneous combustion with the almost instantaneous release of large amounts of energy. This is especially true for the case of metallic compounds wherein extremely high flame temperatures are obtainable.

One group of compounds that have the requisite properties for the hypergolic system of this invention are the metal hydrides. Included in this group are the hydride compounds of barium, boron, calcium, cerium, cesium, copper, gallium, lithium, potassium, rubidium, sodium, tin, hafnium, magnesium, strontium, thorium, and germanium including germanium monohydride, germane, digermane and trigermane.

The most preferred of the above enumerated hydride compounds are those of boron having the general formula $$B_y H_{y+4}$$

where $y$ is a small integer selected from the class consisting of 2, 4, 5, 6, or 10. Examples of such compounds are diborane, dihydrotetraborane, pentaborane, dihydropentaborane, hexaborane and decaborane. Reaction between these compounds and an appropriate oxidizer is reliable and efficient, producing extremely high flame temperatures. Because these compounds are relatively stable, the hazard involved in handling is minimized.

The mixed metal hydrides have desirable properties and are another preferred group of the fuels useable in this invention. Included are lithium aluminohydride, lithium borohydride, potassium borohydride, and sodium borohydride.

Numerous organic and organic-halide compounds of the metals boron, aluminum, and zinc are hypergolic when contacted with an appropriate oxidizer. These compounds have the formula $$R_y M X_z$$

where R is a hydrocarbon radical containing up to about 6 carbon atoms and is selected from the class consisting of alkyl aryl; M is a metal selected from the class consisting of aluminum, boron and zinc; X is a halogen atom; $y$ is a small integer ranging from one to 3 inclusive; $z$ is a small integer ranging from zero to 2; and $y+z$ is equal to the valence of the metal M. Examples of the organic metal compounds are trimethyl aluminum, triethyl-aluminum, tripropylaluminum, trimethylboron, tripropylboron, triethylboron, tribenzylborine, diethylzinc, dimethylzinc, dipropylzinc and dibutylzinc. Examples of organometallic halides are dimethylboron bromide, diethylaluminum chloride, dimethylaluminum chloride, methylzinc chloride and the like.

A preferred group of the hypergolic fuels consists of the alkyl compounds of aluminum, zinc, and boron. These have the formula $$MR_z$$

where M is selected from the class consisting of aluminum, zinc and boron and R is an alkyl radical containing up to about 4 carbon atoms in the molecule and preferably containing from one to 2 carbon atoms in the molecule, and $z$ is a small integer equal to the valence of the metal M.

The especially preferred compounds of this group include trimethylaluminum, triethylaluminum, trimethylboron, triethylboron, and trimethylzinc and diethylzinc. These compounds are especially preferred because of their relatively high stability and high degree of reactivity when contacted with a variety of oxidizing agents.

Alkyl metal hydrides are also desirable fuel constituents of this invention. This class of compounds has the general formula $$R_yMH_z$$

where R is an alkyl radical, M is selected from the class consisting of boron and aluminum and $y$ is a small integer ranging from one to 2 inclusive, and $z$ is a small integer ranging from one to 2, and $y+z$ is equal to the valence of the metal M. Examples of such compounds are dimethylaluminum hydride, diethylaluminum hydride, dimethylboron hydride and diethylboron hydride.

Another group of compounds useable as the hypergolic fuel are the alkyl diboranes having the general formula $$R_xB_2H_{6-x}$$

where R is a lower alkyl group having from about one to 3 carbon atoms and $x$ is a small integer ranging from one to 4. Examples of such compounds are methyldiborane, dimethyldiborane, ethyldiborane, diethyldiborane, methylethyldiborane and the like.

Still other materials that are useable as the hypergolic fuel are the alkyl boron amines. These have the general formula $$R_3NBR_3$$

wherein R is selected from the class consisting of hydrogen and lower alkyl groups having up to about 3 carbon atoms. Examples of such compounds are dimethylborine trimethylamine; methylborine trimethylamine; ethylborine trimethylamine; methylethylborine ethyldimethylamine; etc.

Another class of boron compounds useable are the alkyl triboron triamines. These compounds have the general formula $$R_xB_3N_3H_{6-x}$$

wherein R is a lower alkyl group having up to about 3 carbon atoms in the molecule and $x$ is a small integer ranging from one to 4. Examples of such compounds are dimethyltriborine triamine; methyltriborine triamine; tetramethyltriborine triamine; trimethyltriborine triamine; etc.

I can also use hydrazine and substituted hydrazine compounds for this purpose. The alkyl, phenyl, and mixed phenylalkyl hydrazines such as methylhydrazine, ethylhydrazine, phenylhydrazine, methylphenylhydrazine, methyltolylhydrazine may be used for this purpose.

Still other materials that have the property of being hypergolic and are useable in this invention are powdered metals and dispersions of metals such as magnesium, sodium, zinc, potassium, lithium, calcium, titanium, iron, aluminum, nickel and the like. Being in a finely divided state, upon contact with a proper oxidizer, spontaneous combustion takes place.

Although materials that are normally gaseous can be used, in many instances I find it very desirable to liquefy such materials by pressure or cooling or both. However, I prefer to use those compounds that are normally liquid because of the ease of handling, dispersion properties, and the need for high pressure and cooling equipment is minimized.

Any of the above enumerated materials or mixtures thereof or equivalents thereof may be used as the hypergolic fuel. Indeed, in many cases a mixture of materials is preferred so as to improve the overall characteristics of the fuel. For example, with systems wherein the fuel is dispersed into the combustion chamber, other materials may be included in the fuel to improve the overall properties. Included are hydrocarbon materials such as petroleum naphthas, distillate fuels, jet fuels, synthetic rubber and latex materials, etc. which may be included to improve the overall dispersion properties of the hypergolic fuel.

Any material which when contacted with any of the above-named fuels or an equivalent produces a spontaneous combustion may be used as the oxidizer of the reaction system. Among the materials that can be used are halogens, inter-halogen compounds, oxy- and nitrosohalogen compounds, nitrogen oxides. Further, organic and inorganic peroxides, peracids, acids, permanganates, nitrates, chlorates, perchlorates, chromates, dichromates, and the like may be used.

Of the halogens; that is, fluorine, bromine, chlorine and iodine, it is preferable to use fluorine since it is one of the most powerful oxidizers known, being capable of producing extremely high flame temperatures.

Inter-halogen compounds or mixtures thereof may be used as the oxidizer constituent. Specifically, chlorine trifluoride, bromine trifluoride or mixtures thereof are well suited for this application. These materials are less reactive than liquid fluorine and are preferred for certain applications wherein maximum handling ease is required.

Examples of oxy-nitroso halogen compounds that can be used are nitrosyl chloride, nitrosyl bromide, nitrosyl fluoride, nitryl chloride and nitryl fluoride. All oxides of nitrogen can be used as the oxidizing material. These include nitrous oxide, nitric oxide, nitrogen trioxide, nitrogen oxide, nitrogen tetraoxide and nitrogen pentoxide.

Additional compounds that are useable as the oxidizing constituent are peroxides such as the peroxides of hydrogen, sodium, magnesium, potassium, calcium, and zinc. Benzoyl peroxide, cumene hydroperoxide, and other organic peroxides can be used. Other appropriate oxidizing materials are inorganic peracids such as persulfuric acid, peracetic acid and the like.

Another class of compounds that may be used as the oxidizer are the chlorates and perchlorates. Examples of these materials are sodium chlorate, sodium perchlorate, potassium chlorate, potassium perchlorate, magnesium perchlorate, ammonium perchlorate, etc. Of these, ammonium and potassium perchlorate are preferred because they are only slightly soluble in water and, therefore, can be used in propellant grains which will be exposed to moisture.

The inorganic nitrates may also be used as the oxidizer constituent. These include potassium nitrate, sodium nitrate, ammonium nitrate, etc. Still other compounds that are useable as the oxidizer constituent are the chromates and dichromates. These include potassium chromate, potassium dichromate, sodium chromate, sodium dichromate.

Certain materials contain both an oxidizer and a fuel portion in the molecule. These compounds are relatively unstable and once the reaction is started are capable of combustion in the absence of all other materials. These chemicals can be used as either the fuel or oxidizer constituent of this invention. Some preferred examples are the organic nitrates such as glycerol trinitrate, diethylene glycol dinitrate and cellulose nitrate.

In one aspect of this invention, the fuel portion of the hypergolic system is the coated constituent i.e., incorporated on the propellant surface and the oxidizer is dispersed into the combustion chamber and caused to contact the propellant surface. In such cases the fuel constituent incorporated on the propellant surface is in the solid or a semisolid state. The fuels that I prefer to use for such a system are the normally solid metal hydrides such as lithium alumino hydride, lithium borohydride, potassium borohydride, sodium borohydride, lithium hydride, etc. Other useable materials for this purpose are solid, semisolid, or gelled hydrazine and hydrazine derivatives such as methylhydrazine, ethylhydrazine, phenylhydrazine and gelled metal alkyls such as trimethylaluminum, triethylaluminum, etc. Other materials that may be used as the fuel in this manner are inorganic amines such as sodamide, and organic amines and solid amines.

In another aspect of this invention, the fuel is the dispersed constituent, i.e., it is introduced into the combustion so as to contact the propellant grain surface which incorporates an oxidizer. For such systems I prefer to use as the fuel liquid compounds such as the alkyl compounds of aluminum, zinc, and boron. Other materials useable as the fuels of this system are the normally liquid alkyl metal halides, the hydride compounds of boron and the alkyl metal hydrides of boron and aluminum. The most preferred of these compounds are the lower alkyl and hydride compounds of alluminum; namely, trimethylaluminum, triethylaluminum, dimethylaluminum hydride and diethylaluminum hydride.

In systems wherein the oxidizer is the dispersed constituent, I can use gaseous materials such as fluorine, chlorine, bromine trifluoride and chlorine trifluoride, etc. In many instances I find it desirable to store these materials in vessels in the liquid state by the use of pressure, cooling, or both. In many systems normally liquid materials such as red fuming nitric acid, sulfuric acid, hydrogen peroxide, and the easily liquefiable gases such as chlorine trifluoride are highly preferred. In these cases the need for cooling and high pressure equipment is minimized.

In reaction systems wherein the oxidizer is the coating constituent and incorporated on the grain surface, I prefer to use normally solid materials such as the chlorates and perchlorates of potassium, sodium, and ammonium. In many instances, I find it advantageous to use an organic oxidizing agent such as benzoyl peroxide either singly or in combination with other oxidizing agents. I find this especially true in cases where the igniter fuel would not dissolve inorganic oxidizing agents but does show some solubility with organic oxidizing agents. For example, some fuels may not dissolve ammonium nitrate, ammonium perchlorate, etc. but will dissolve organic agents such as benzoyl peroxide. In such cases the igniter fuel initially reacts with the organic oxidizer and liberates enough heat to cause partial decomposition of the inorganic oxidizer. The oxygen that is released by the decomposition of the inorganic material further reacts with the fuel, further increasing temperatures and causing the reaction to proceed at a faster rate. Sufficient energy is thereby generated for efficient ignition of the propellant. Such a system, incorporating an organic oxidizing agent, results in a sperior hypergolic system and, therefore, constitutes a preferred embodiment of this invention.

As previously discussed, hypergolicity is a specific property of a reaction system, each reactant being mutually dependent upon the other for this property. It, therefore, should be pointed out that not all of the enumerated fuels when contacted with every oxidizer will produce a hypergolic reaction. For example, normally solid lithium borohydride will not produce a hypergolic reaction when contacted with oxidizing agents such as air, oxygen, and mild acids whereas when contacted with more powerful oxidizing agents such as chlorine trifluoride, a hypergolic reaction will result. Moreover, different systems show varying degrees of hypergolicity with the attendant release of different rates and amounts of energy. Reaction systems that are capable of producing a hypergolic reaction may be determined empirically with a minimum of effort. A great number of systems that are hypergolic are possible and it remains for the user to determine which is most desirable for a specific application.

The following are examples or some of my preferred hypergolic systems. In Examples 1 to 23 the fuel is the coating constituent incorporated into the propellant grain surface and the oxidizer is introduced into the combustion chamber as the dispersed fluid and caused to contact the grain surface.

| Example | Coating thickness, inches ×10⁻³ | Fuel | Oxidizer |
|---|---|---|---|
| 1 | 1 | Lithium hydride | Fluorine. |
| 2 | 5 | ----do---- | Red fuming nitric acid. |
| 3 | 20 | ----do---- | Hydrogen peroxide. |
| 4 | 15 | ----do---- | Chlorine trifluoride. |
| 5 | 10 | ----do---- | Ozone. |
| 6 | 20 | Lithium borohydride | Red fuming nitric acid. |
| 7 | 3 | ----do---- | Hydrogen peroxide. |
| 8 | 35 | ----do---- | Bromine trifluoride. |
| 9 | 30 | ----do---- | Ozone. |
| 10 | 40 | Lithium alumino hydride | Red fuming nitric acid. |
| 11 | 15 | ----do---- | Hydrogen peroxide. |
| 12 | 20 | ----do---- | Fluorine. |
| 13 | 20 | ----do---- | Chlorine trifluoride. |
| 14 | 100 | Sodium alumino hydride | Red fuming nitric acid. |
| 15 | 40 | ----do---- | Nitorgen pentoxide. |
| 16 | 10 | ----do---- | Nitroxyl chloride. |
| 17 | 5 | ----do---- | Bromine trifluoride. |
| 18 | 1 | ----do---- | Fluorine. |
| 19 | 30 | ----do---- | Hydrogen peroxide. |
| 20 | 20 | Beryllium hydride | Ozone. |
| 21 | 5 | ----do---- | Fluorine. |
| 22 | 40 | ----do---- | Red fuming nitric acid. |
| 23 | 15 | ----do---- | Chlorine trifluoride. |

In Examples 24 to 36 wherein the indicated mixtures are in terms of weight percent, the oxidizer is the coating constituent incorporated into the propellant grain surface. The fuel is introduced into the combustion chamber as the dispersed fluid and caused to contact the grain surface and thereby cause spontaneous combustion.

| Example | Fuel | Coating thickness, in.×10⁻³ | Percent | Oxidizer |
|---|---|---|---|---|
| 24 | Trimethylaluminum. | 3 | 55 | Ammonium perchlorate. |
| | | | 45 | Benzoyl peroxide |
| 25 | ----do---- | 15 | 50 | Ammonium nitrate. |
| | | | 50 | Benzoyl peroxide. |
| 26 | ----do---- | 10 | 65 | Sodium nitrate. |
| | | | 35 | Benzoyl peroxide. |
| 27 | Dimethylaluminum chloride. | 10 | 60 | Ammonium perchlorate. |
| | | | 40 | Benzoyl peroxide. |
| 28 | 67% triethylaluminum +33% diethylaluminum hydride. | 7 | 33 | Benzoyl peroxide. |
| | | | 33 | Ammonium perchlorate. |
| | | | 33 | Powdered magnesium. |
| 29 | Triethylaluminum. | 20 | 33 | Benzoyl peroxide. |
| | | | 33 | Ammonium perchlorate. |
| | | | 33 | Powdered magnesium. |
| 30 | Diethylaluminum. | 3 | 50 | Ammonium perchlorate. |
| | | | 50 | Benzoyl peroxide. |
| 31 | 67% triethylaluminum +33% diethylaluminum hydride. | 15 | 20 | Urea peroxide. |
| | | | 20 | Benzoyl peroxide. |
| | | | 60 | Ammonium perchlorate. |
| 32 | 67% triethylaluminum +33% diethylaluminum hydride. | 35 | 40 | Potassium nitrate. |
| | | | 60 | Benzoyl peroxide. |
| 33 | 15% triethylaluminum +85% diethylaluminum hydride. | 20 | 15 | Benzoyl peroxide. |
| | | | 55 | Ammonium perchlorate. |
| | | | 30 | Powdered magnesium. |
| 34 | 75% trimethylaluminum +25% triethylaluminum. | 3 | 22 | Benzoyl peroxide. |
| | | | 15 | Powdered magnesium. |
| | | | 63 | Ammonium perchlorate. |
| 35 | Triethylboron. | 7 | 40 | Ammonium nitrate. |
| | | | 30 | Benzoyl peroxide. |
| | | | 30 | Powdered magnesium. |
| 36 | 50% trimethylboron +50% triethylaluminum. | 12 | 33 | Benzoyl peroxide. |
| | | | 33 | Ammonium perchlorate. |
| | | | 33 | Powdered magnesium. |

In some cases the propellant grain may inherently contain one of the hypergolic constituents. In these cases the heterogeneous hypergolic coating may be eliminated, and contacting the dispersed constituent with the uncoated propellant grain surface will initiate the reaction, although in many instances, even with such propellants, ignition is not as sure and smooth as with the heterogeneous propellants. In Examples 37–39 the oxidizer is the coating constituent and is inherent in the solid propellant composition, being uniformly distributed therein, and the fuel is introduced into the combustion chamber as the dispersed fluid.

| Example | Fuel | Percent | Propellant grain composition |
|---|---|---|---|
| 37 | Triethylaluminum | 60<br>10<br>25<br>3<br>2 | Ammonium perchlorate.<br>Pulverized aluminum.<br>Polyurethane.<br>Benzoyl peroxide.<br>Miscellaneous additives. |
| 38 | Diethylaluminum hydride. | 60<br>10<br>25<br>3<br>2 | Ammonium perchlorate.<br>Pulverized aluminum.<br>Polyurethane.<br>Benzoyl peroxide.<br>Miscellaneous additives. |
| 39 | Trimethylboron | 60<br>10<br>25<br>3<br>2 | Ammonium perchlorate.<br>Pulverized aluminum.<br>Polyurethane.<br>Benzoyl peroxide.<br>Miscellaneous additives. |

In Examples 40 and 41, the fuel is an inherent part of the solid propellant composition being uniformly distributed therein. The oxidizer is introduced into the combustion chamber as the dispersed constituent.

| Example | Oxidizer | Percent | Propellant grain composition |
|---|---|---|---|
| 40 | Chlorine trifluoride | 70<br>15<br>13<br>2 | Ammonium perchlorate.<br>Polybutadiene.<br>Polystyrene.<br>Miscellaneous additives. |
| 41 | Bromine trifluoride | 70<br>15<br>13<br>2 | Ammonium perchlorate.<br>Polybutadiene.<br>Polystyrene.<br>Miscellaneous additives. |

Examples 42 to 47 are examples wherein a given compound may be either the fuel or the oxidizer. Such compounds are relatively unstable and are capable of oxidizing their own organic material once the reaction is started. Either fuel or oxidizer type materials may be used to start the reaction. In the following examples, the indicated compositions are coated on the propellant grain surface in the form of a thin layer. Ignition is accomplished by introducing into the combustion chamber either a fuel or an oxidizer as the dispersed constituent.

| Example | Dispersed constituent | Coating thickness, in.×10⁻³ | Coating composition, percent |
|---|---|---|---|
| 42 | Red fuming nitric acid | 15 | 35 glycerol trinitrate.<br>5 benzoyl peroxide.<br>60 cellulose nitrate. |
| 43 | Chlorine trifluoride | 7 | 35 glycerol trinitrate.<br>5 benzoyl peroxide.<br>60 cellulose nitrate. |
| 44 | Triethylaluminum | 4 | 35 glycerol trinitrate.<br>5 benzoyl peroxide.<br>60 cellulose nitrate. |
| 45 | Red fuming nitric acid | 18 | 25 diethyleneglycol dinitrate.<br>30 glycerol trinitrate.<br>40 cellulose nitrate.<br>5 benzoyl peroxide. |
| 46 | Trimethylaluminum | 20 | 25 diethyleneglycol dinitrate.<br>30 glycerol trinitrate.<br>40 cellulose nitrate.<br>5 benzoyl peroxide. |
| 47 | Chlorine trifluoride | 4 | 25 diethyleneglycol dinitrate.<br>30 glycerol trinitrate.<br>40 cellulose nitrate.<br>5 benzoyl peroxide. |

In designing a specific ignition system as contemplated by this invention, consideration must be given to the composition of the propellant grain. The coating material, be it the oxidizer or the fuel, must be compatible with the grain composition. Consideration must be given to stability, reactivity, ease of formulation and the tendency of the coating material to migrate into the grain.

It is not possible to make a generalization as to the amounts of fuel and oxidizer that are required to ignite a solid propellant grain. Factors determinative of this quantity are composition, amount, and the configuration of the propellant grain and the specific fuel-oxidizer system chosen. A variety of fuels and oxidizers are available to form hypergolic systems with widely ranging energy generating capacities. From this group one skilled in the art will be able to select a system that has the specific properties most desirable for a given application.

Some generalizations as to the amount of energy required to ignite the propellant grain can be made. Naturally, different materials require different energy levels before ignition takes place. However, with the type propellants in current use from about 0.1 to 20 calories/sq. cm. of propellant grain surface is oftentimes adequate for ignition. Variations within this range will be dependent upon the rate of heat transfer into the grain. Amounts much less than the above minimum may not lead to adequate ignition whereas energy transfer of much more than 20 calories/sq. cm. may lead to excessive rates of pressure rise or even to detonation. Of course, these limits are subject to change as newer propellant grains and propellant combustion chambers are designed. The relative amounts of fuel and oxidizer vary dependent upon the specific reaction system. In many cases I prefer to use proportions somewhat near those stoichiometrically required.

The hypergolic chemicals are kept apart from each other until just prior to the time of ignition. The time period from initiating the flow of the dispersed constituent to the time of ignition of the propellant grain varies over a fairly wide range. Factors determinative of this time period include the type of chemicals used, the rate at which the dispersed constituent is introduced into the combustion chamber, and the rate of heat transfer to the grain surface proper. The time period is usually less than about 400 milliseconds and oftentimes less than 100 milliseconds.

Any appropriate system may be used to introduce the dispersed constituent into the rocket combustion chamber so as to contact the coating constituent. Requisites are fast and intimate contact of the two materials so as to provide an immediate reaction which, in turn, initiates combustion of the propellant grain. Also, it is highly desirable to initiate reaction over all of the propellant grain surface rather than localized areas.

The mode of carrying out this invention will be better understood by reference to the following examples.

*Example 48*

In this example the fuel is dispersed into the combustion chamber and caused to contact the propellant grain surface which is coated with an oxidizer. The propellant grain is cylindrical in shape, its center portion being hollowed. The grain is composed of a mixture of asphalt, nitrocellulose, ammonium perchlorate and minor proportions of miscellaneous additives. It also contains minor amounts of inhibitors and other additives. During the propellant grain fabrication, a mixture of 50 weight percent benzoyl peroxide and 50 percent ammonium perchlorate is bonded to the exposed, inner surface of the hollowed propellant grain. The thickness of the layer is approximately 0.015 inch.

Triethylaluminum is contained in a closed vessel mounted on the forward end of the rocket combustion chamber. Pressure of 300 pounds per square inch is developed in the vessel by means of a compressed nitrogen cartridge attached to the vessel. The vessel has an outlet in the form of a short threaded pipe. A valve is attached to this outlet and, in turn, a spray bar is attached to the outlet portion of the valve. The valve incorporates a sliding plate which, when in its forward position, completely seals the valve opening. By sliding the plate forward the valve port is completely open and unobstructed. A hydraulic pressure line attached to the valve and remotely controlled, is used to cause the plate to slide to its open position, thereby initiating the dispersion of trimethylaluminum.

The spray bar, attached to the exit side of the valve, is a long metallic pipe and extends horizontally and parallel to the cylindrical axis of the propellant grain for its entire length. The bar has a series of perforations so placed so as to allow a stream of the dispersed constituent to spray over all of the exposed surface of the propellant grain.

By remote control, the hydraulic pressure exerted on the sliding plate is increased thereby causing the valve to open. The liquid triethylaluminum is forced through the valve, into the spray bar, and is subsequently sprayed out through the spray bar perforations onto the coated propellant surface. Upon contact with the benzoyl peroxide-ammonium perchlorate mixture, reaction in the form of spontaneous combustion takes place on the propellant grain surface. Because of solid-to-solid contact, energy is efficiently transferred to the propellant grain primarily by conduction. Upon transfer of sufficient energy, the grain surface itself ignites and controlled combustion proceeds in accordance with the properties of the specific propellant grain.

*Example 49*

In this example, the oxidizer is the dispersed constituent and the fuel is an inherent part of the grain composition. The propellant grain is cylindrical in shape having a hollowed center portion. The grain is composed of a mixture of 50 weight percent cellulose nitrate, 40 weight percent glycerol trinitrate, 7 weight percent polybutadiene, and minor amounts of inhibitors and other additives. After fabricating, the solid propellant grain is firmly positioned in the rocket combustion chamber.

The oxidizer, chlorine trifluoride, is contained in a closed vessel mounted on the forward end of the rocket combustion chamber. Pressure of 250 pounds per square inch is developed within the vessel by means of a compressed nitrogen cartridge attached to the vessel. Similar to the method of Example 48, remotely controlled hydraulic pressure is used to open the vessel valve and initiate the flow of the dispersed constituent into the combustion chamber. However, in this case, the pipe attached to the valve outlet extending along the axis of the propellant grain is not perforated. Rather, a series of spray nozzles are attached to the pipe and are directed so as to completely encompass the propellant grain surface.

By opening the vessel valve, the chlorine trifluoride is forced through the valve into the pipe and is dispersed through the spray nozzles into the combustion chamber. Upon contact with the propellant grain surface, spontaneous combustion takes place. Sufficient energy generated by this reaction is transferred to the propellant grain, thereby causing it to ignite.

It is apparent that there may be many variations of the above-described method and still be within the true intent of this invention. Any appropriate means may be used to introduce the dispersed constituent into the combustion chamber and into contact with the propellant grain surfaces. For example, rather than using a spray bar or spray nozzles, as described in the examples, a vessel or a series of vessels may be placed within the combustion chamber. These vessels, containing the dispersed constituent under pressure, may be perforated or fractured by an explosive mechanism or by direct mechanical means thereby liberating the dispersed constituent so as to contact the propellant grain surface.

The method of initiating the reaction, i.e., introducing the dispersed constituent into the combustion chamber, may also be accomplished in a variety of ways. Rather than opening the sliding plate-type valve by hydraulic pressure as described, this end may be accomplished by electrical or direct mechanical energy. Alternatively, different opening means may be employed such as a gate-type valve or diaphragm which ruptures at a given pressure or which may be punctured. Also, a mechanism may be incorporated into the system whereby when the combustion chamber pressure reaches a predesignated level, the flow of the dispersed constituent automatically stops.

Various techniques may be employed to apply the coating constituent on the propellant grain surface. The coating constituent may be applied or incorporated during or after fabrication of the propellant grain. It may be applied using a volatile solvent or applied directly in solid form. Also, the coating constituent may be bonded to a foil or thin sheet of material such as aluminum or magnesium and, in turn, bonded to the propellant grain. In this manner the propellant grain is protected from contamination due to the active coating and environmental gases.

This method of ignition may be used to ignite all types of solid propellant grains. The grains may be of the composite or double base type, or a combination of these. The composite type grains are composed of a mixture of a fuel and an oxidizer neither of which would burn satisfactorily without the presence of the other, whereas with a double base type, a chemical compound capable of combustion in the absence of all other material makes up the total grain. The latter type are composed of materials such as glycerol trinitrate, cellulose nitrate, and diethyleneglycol dinitrate and usual contain minor amounts of other additives used to control the physical and chemical properties of the total grain.

In the composite type grains, perchlorates of sodium, potassium, magnesium, or ammonium are quite often used as the oxidizer portion. Other oxidizers that are often used are inorganic nitrates of potassium, sodium, and ammonium. The fuel portion of the composite propellant grain may be a petroleum-derived hydrocarbon such as asphalt or thermosetting plastics such as phenol formaldehyde and phenol furfural resins, or non-thermosetting plastics such as styrene, polyurethanes, synthetic rubber, latex, and gum-like products.

In addition to the principal ingredients in the propellant grains, additives are used to improve specific grain properties. Minor amounts of additives are added to control the burning rate, increase chemical stability, control radiation absorption properties, improve physical properties such as mechanical strength and elasticity, minimize temperature sensitivity, and control various processing properties of the propellant during fabrication such as curing time, fluidity, etc.

I claim:

1. The method of igniting a solid propellant solely by the energy liberated by one prior chemical reaction between a strong reducing fluid and an oxidizing material, said strong reducing fluid being selected from the class consisting of alkyl diborines, alkyl borine amines, alkyl triborine triamines, hydrazine, and the alkyl, alkyl halide and alkyl hydride compounds of aluminum, boron and zinc, and said oxidizing material being selected from the group consisting of chlorates, perchlorates, permanganates, organic and inorganic nitrates, chromates, dichromates, peracids, organic oxidizing agents and mixtures thereof, said oxidizing material being present as a layer coating the surface of said solid propellant, said coating ranging in thickness from 0.001 to 0.1 inch, said method comprising introducing said strong reducing fluid into a combustion chamber containing said coated propellant so that said strong reducing fluid contacts and spontaneously reacts with said oxidizing material, thereby liberating and transferring to said solid propellant sufficient energy to cause it to ignite, said strong reducing fluid and said oxidizing material being the only chemicals available for reaction with each other in said combustion chamber prior to ignition of said solid propellant.

2. The method of claim 1 wherein said strong reducing fluid is an alkyl aluminum compound.

3. The method of claim 1 wherein said strong reducing fluid is triethyl aluminum.

4. The method of claim 1 wherein said oxidizing material is a perchlorate.

5. The method of claim 1 wherein said oxidizing material is ammonium perchlorate.

6. The method of claim 1 wherein said strong reducing fluid is triethyl aluminum and said oxidizing material is ammonium perchlorate.

7. The method of claim 1 wherein said chemicals are present in amounts such that from about 0.1 to 20 calories per square centimeter of propellant surface are transmitted to said propellant grain.

8. The method of claim 1 wherein said oxidizing material contains at least 3 percent of an organic oxidizing agent.

References Cited in the file of this patent

UNITED STATES PATENTS

| | | |
|---|---|---|
| 2,933,381 | Ruskin | Apr. 19, 1960 |
| 2,944,881 | Ruskin | July 12, 1960 |
| 2,959,001 | Porter | Nov. 8, 1960 |
| 2,974,484 | Cooley | Mar. 14, 1961 |
| 3,028,810 | Proell | Apr. 10, 1962 |
| 3,032,449 | Fox et al. | May 1, 1962 |